Figure 1:
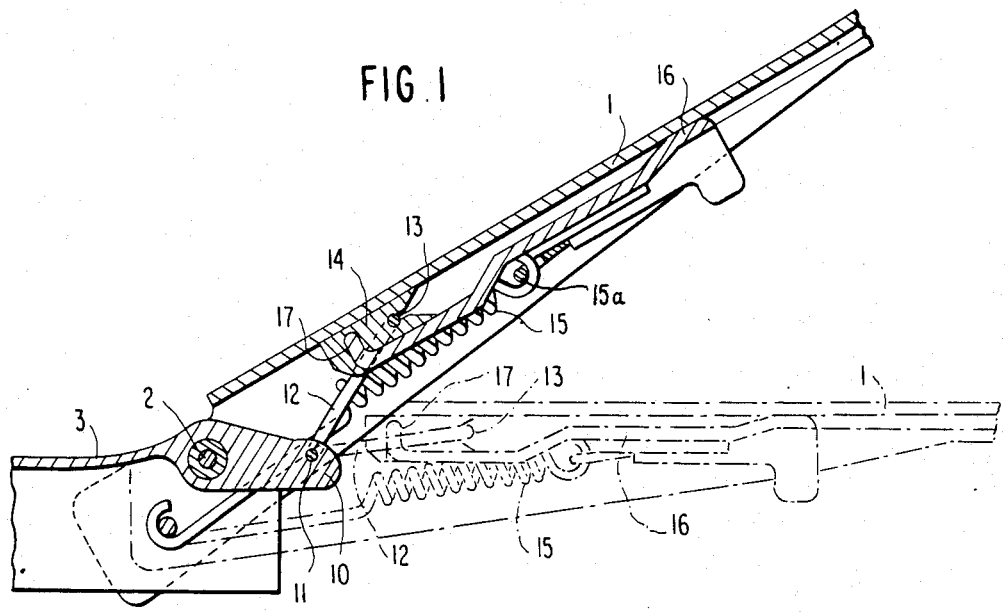

United States Patent [19]

Epple et al.

[11] Patent Number: 4,674,145
[45] Date of Patent: Jun. 23, 1987

[54] WIPER ARM IN MOTOR VEHICLE WINDSCREEN WIPER INSTALLATIONS

[75] Inventors: Anton Epple, Rottenburg; Hans Trube, Herrenberg; Martin Pfeiffer, Stuttgart, all of Fed. Rep. of Germany

[73] Assignee: Daimler-Benz Aktiengesellschaft, Fed. Rep. of Germany

[21] Appl. No.: 773,070

[22] Filed: Sep. 6, 1985

[30] Foreign Application Priority Data

Sep. 8, 1984 [DE] Fed. Rep. of Germany ....... 3433056

[51] Int. Cl.$^4$ ................................................ B60S 1/34
[52] U.S. Cl. .............................. 15/250.19; 15/250.35
[58] Field of Search ............. 15/250.15, 250.19, 250.2, 15/250.34, 250.35

[56] References Cited

U.S. PATENT DOCUMENTS 2,097,152 10/1937 Goetz .............................. 15/250.19
2,230,596 2/1941 Horton ............................ 15/250.19

FOREIGN PATENT DOCUMENTS 897826 6/1944 France ............................ 15/250.34
1206581 8/1959 France .

Primary Examiner—Peter Feldman
Attorney, Agent, or Firm—Barnes & Thornburg

[57] ABSTRACT

A wiper arm in motor vehicle windshield wiper installations having, attached on a wiper shaft to be driven, a bearing part, the contact force of which directed towards an associated windshield in an operational position is generated by the action of a traction spring, while the wiper arm is positionable out of the operational position into a raised position in which it is anchored wherein an additional bracing member is arranged between an extension of the bearing part and the wiper arm for secure anchorage, particularly in the case of a raised position oriented at an acute angle to the operational position of the wiper arm.

8 Claims, 8 Drawing Figures

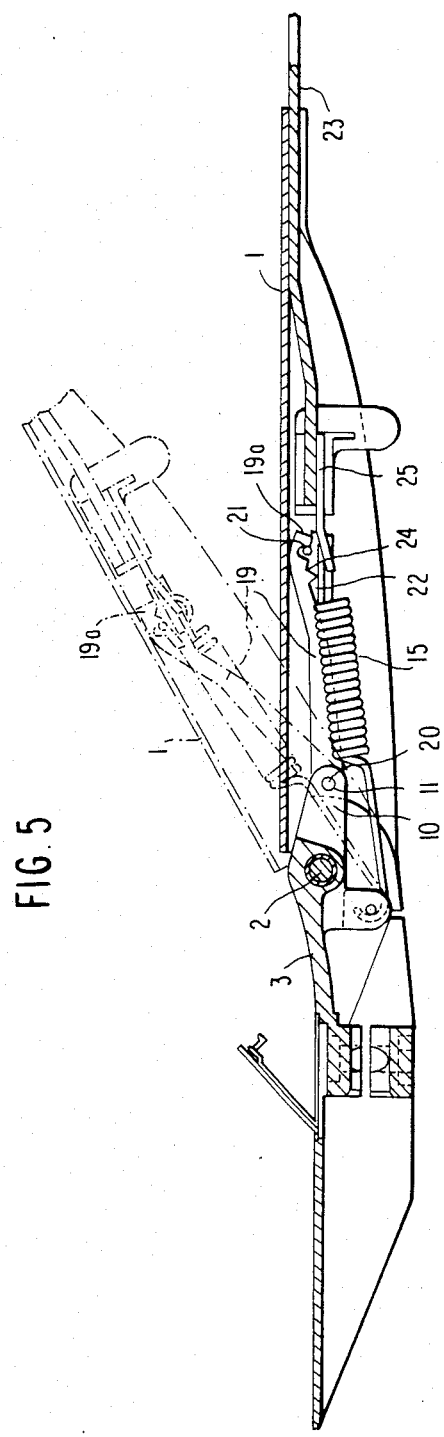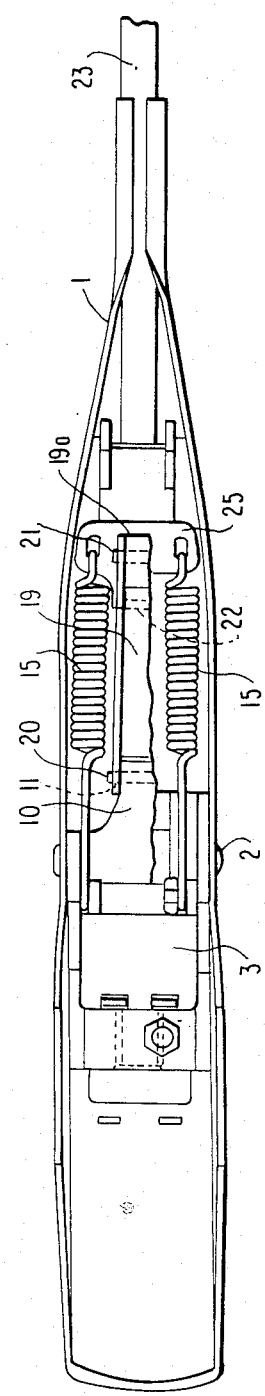

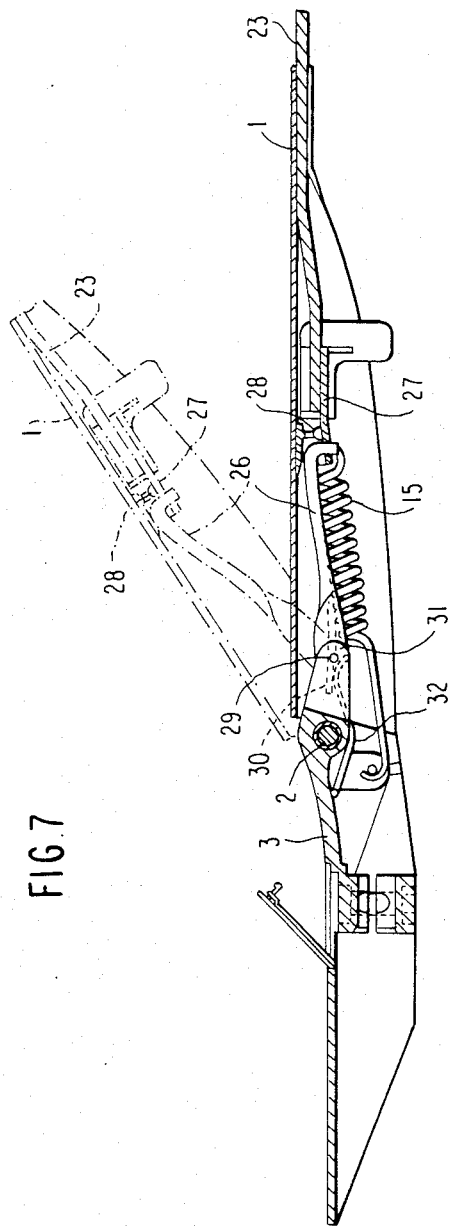
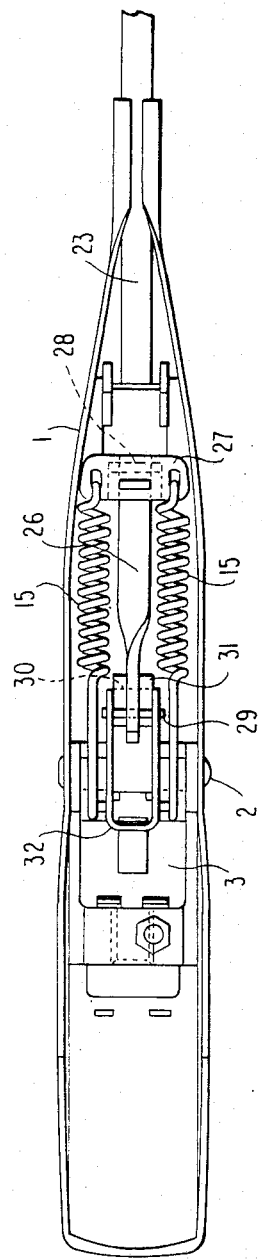
FIG. 7
FIG. 8

WIPER ARM IN MOTOR VEHICLE WINDSCREEN WIPER INSTALLATIONS

The invention relates to a wiper arm in motor vehicle windshield wiper installations of the type having a bearing part located between a wiper arm and wiper shaft with articulation of the wiper arm to the bearing part by way of a pivot axis and having pivotability of the wiper arm out of a position of abutment against the windshield into a rest position raised from the windshield at an acute angle with respect to the position of abutment, and with stressing of the wiper arm in the direction of abutment against the windshield by way of a traction spring element connected to the bearing part at a first location and to the wiper arm at a second location, the connection at the first location of which, in the rest position, is located with respect to the pivot axis remote from the wiper arm, and the line of motion of which is oriented laterally offset relative to the pivot axis of the wiper arm and is offset farther from the wiper arm towards the windshield in the abutment position than in the rest position and, in which the rest position of the wiper arm is fixed relative to the bearing part.

A wiper arm of this type is known from German Utility Design No. 1,774,020. In that case the traction spring element which causes the stressing of the wiper arm is, in the abutment position, oriented laterally from the pivot axis laterally offset towards the windshield, that is, towards the free end of the wiper arm, with a line of action oriented obliquely to the longitudinal extension of the wiper arm with enlargement of the interval from the windshield. The locking in the rest position occurs by displacement of the extremity of the traction spring element adjacent to the pivot axis away from the windscreen into a position in which the line of action of the spring element is oriented on the other side of the pivot axis, referred to the initial position in the abutment position, and therefore beyond the dead center position. The change of position is made possible in that the connection is constructed as a slotted sliding guideway for the corresponding spring end, in which the slot is oriented on the side of the pivot axis remote from the wiper arm and transversely to the longitudinal extension of the wiper arm.

Apart from such a sliding guideway, particularly from the standpoint of corrosion and fouling, which impair the function in the long term and may ultimately impair a secure anchorage in the rest position, such a construction can scarcely be used for solutions with small pivot angles between abutment position and rest position.

A wiper arm is also already known, from French Patent No. 1,206,581, to the bearing part of which a bracing member is articulated which is oriented towards the wiper arm in an operational position and braces the wiper arm relative to the bearing part in a raised rest position, in which case it is angled obliquely to the wiper arm.

However, in this case the contact force of the wiper arm is generated by means of a compression spring, the spring tension of which is effected in the bracing direction of the bracing element. Therefore a position of the bracing element beyond dead center relative to the bearing axis of the wiper arm on the bearing part is necessary for a fixed raised rest position of the wiper arm, so that such a construction also can scarcely be used for solutions with small pivot angles between operational position and rest position.

Furthermore, it is necessary for the bracing element, in the operational position, to exhibit an inclination towards an associated windshield, in order that the spring loading by the compression spring can still take effect in the abutment direction of the wiper arm. However, this necessary inclination of the bracing element has disadvantageous effects upon the overall depth in the articulation side lower section of the wiper arm.

An object of the invention is to develop a wiper arm of the type referred to, so that its operational reliability is improved, and in which the raised position of the wiper arm is anchored reliably even in the case of small raising angles.

Another object of the invention is the provision of a windshield wiper installation wherein a wiper arm in its rest position is articulated relative to a bearing part by way of a bracing member engaging the bearing part at one end and the wiper part at a second end, the bracing member being constructed as a sliding guide means forming a catch connection in the rest position of the wiper arm, said one end of the bracing member being positioned offset relative to the pivot axis of the wiper arm towards the end of the wiper arm in its abutment position, and which extends towards the wiper arm in its abutment position and obliquely away from the pivot axis toward the wiper arm in its rest position.

Another object of the invention is the provision of a windshield wiper assembly wherein a bracing member comprises a rectangular spring yoke having first and second yoke sections of which said first yoke section is articulated in an extension of the bearing part, and the second yoke section which engages a catch device attached on the side of the wiper arm when the wiper arm is raised possessing the advantages that it is simple and inexpensive to produce, particularly from semi-finished material by bending spring wire to proper dimensions, thereby eliminating virtually all wastage and, moreover, requiring no finishing operation.

It is another object of the invention to produce a windshield wiper assembly wherein a spring yoke is simultaneously characterized by low weight and the fact that it can be assembled and dismantled very quickly.

Another object of the invention is the production of a windshield wiper assembly wherein a catch device is formed as a clamp-shaped plastic clip.

A further object of the invention is to produce a windshield wiper assembly wherein a plastic clip is retained by a lower bent end of a wiper rod of the windshield wiper arm.

Another object of the invention is the production of a windshield wiper assembly wherein a catch device is formed by a sliding block having yoke sections, one of which is slidable and positionable by the pretension of a catch spring when the wiper is in raised position.

Another object of the invention is the provision of a windshield wiper assembly wherein a sliding block is of integral construction and is clipped on to a bent terminal section of a wiper rod, the said terminal section of the wiper rod forming a catch spring of a catch device, an outer end of the wiper rod being bent to limit the extension of the sliding of one of the yoke sections.

A further object of the invention is provision of a clamp-shaped plastic clip which can be produced inexpensively, as an injection molded component for example, produced integrally by virtue of its self-resilience which is necessary for clip connections.

In conjunction with its attachment to the wiper rod, additional attachment means can be totally omitted.

It is another object of the invention to produce a windshield wiper assembly wherein a sliding block and an associated catch spring are subject to less wear, so that advantages may be achieved with regard to the durability of reliable fastening.

It is another object of the invention to provide a windshield wiper assembly wherein, in addition to its retaining function for a sliding block, is further used as a catch spring for a fastening device, a minimum outlay of material and assembly is effected almost comparable with that of the clip solution.

It is another object of the invention to provide a windshield wiper assembly wherein a bracing member is formed by a strut of U-shaped cross-section mounted pivotally on a bearing axis in an extension of the bearing part at a first end, and at a second end provided with a guide bolt, the guide bolt being slidable relative to a spring-loaded sliding block, the spring pretension being exerted by a free end of a wiper rod.

It is another object of the invention to provide a windshield wiper assembly wherein a bracing member is formed by a twisted flat strut, a first end of which is bent and is adjacent the wiper arm and hooked into a bracket mounted to the wiper arm and a second end of which is guided slidably by means of a bolt in a slot guideway of a U-shaped bifurcate extension of said bearing part, the bolt being anchored by a catch spring.

It is another object of the invention to provide a windshield wiper assembly employing a strut, which, in one example, may be twisted and flat such that the articulation section of a wiper arm can be dimensioned in narrow form based upon the fact that the mutual interval of helicoidal traction springs oriented adjacent the bracing element affect the overall width of the wiper arm.

These and other objects, features and advantages of the present invention will be come more apparent from the following description when taken in connection with the accompanying drawings which show, for the purposes of illustration only, plural embodiments in accordance with the present invention, and wherein:

FIGS. 1, 3, 5, and 7 each show different embodiments of the invention, the figures respectively showing a longitudinal section through an articulation-side lower section of a wiper arm and FIGS. 2, 4, 6 and 8 show corresponding associated rear elevations to the corresponding sections.

Figure 2:
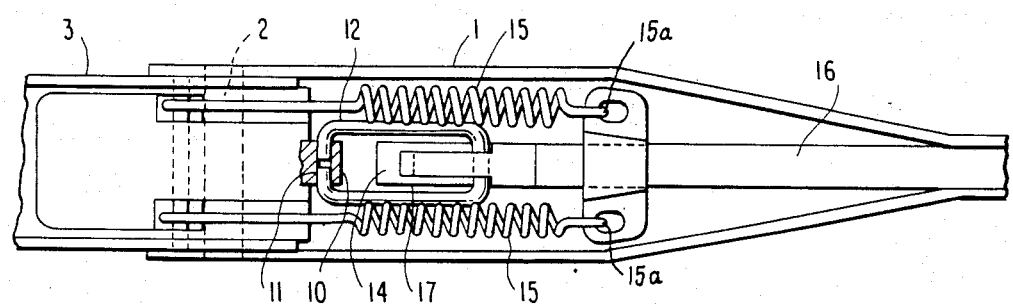

Referring now to the drawings wherein like reference numerals are used to designate like parts and more particularly to FIGS. 1 and 2, a wiper arm 1 is connected via a pivot bearing 2 to a bearing part 3 which is attached to a wiper shaft not shown to be driven. The bearing part 3 is extended beyond the pivot bearing 2 to form an extension 10, in which a bore 11 is present. A rectangularly bent spring yoke 12 made of spring wire is inserted on its open side by the angled members into the bore 11, so that the spring yoke 12 is pivotally mounted. In the raised position of the wiper arm 1, the spring yoke 12 abuts, by the opposite short yoke section, in a clip aperture 13 of a clamp-shaped plastic clip 14. The spring yoke 12 thus acts as a strut for the wiper arm 1 braced at bracing point at aperture 13. Two helicoidal traction springs 15, which are oriented on both sides of the spring yoke 12, are articulated at 15a to the wiper arm 1 above the bracing point at aperture 13, and to the bearing part 3 in such a way that the plane of action of the helicoidal traction springs 15, in the raised rest position of the wiper arm 1, is oriented between the pivot bearing 2 of the wiper arm 1 and the bore 11 in which the spring yoke 12 is hooked. Consequently, the helicoidal traction springs 15 load the wiper arm 1 in the direction of abutment in this raised rest position with a substantially weaker moment relative to the operational position, about pivot bearing 2, because the interval of moments which is prescribed by the interval between the plane of action of the helicoidal traction springs 15 and the pivot bearing 2 has been substantially shortened, whereas the gain of tractive force dictated by the longitudinal extension of the helicoidal traction springs 15 is relatively slight.

The said shifting of the plane of action of the helicoidal traction springs 15 which occurs when the wiper arm 1 is raised is therefore of critical significance, because a sole compensation of the torque engaging the wiper arm 1 in the operational position would demand a substantially more rigid spring yoke 12 and such powerful clamping forces in the plastic clip 14, that it would no longer be possible to ensure easy manipulation in the operation of raising the wiper arm 1.

The explained functional principle of a shifting of the plane of action of the helicoidal traction springs 15 relative to the pivot bearing 2, whereby the bracing member and the catch device are relieved, is therefore adopted in all the exemplary embodiments shown in FIGS. 1-8.

The clamping forces of the plastic clip 14 must therefore be of such a magnitude that the traction of the helicoidal traction springs 15 acting counter to the bracing direction cannot lead to the spring yoke 12 slipping out of the plastic clip 14.

In this case the wiper-arm-side attachment of the plastic clip 14 is effected in that a wiper rod 16 in a section thereof proximate clamp-shaped plastic clip 14 is bent through approximately 90° at its free end and inserted into a housing aperture 17 of the plastic clip 14 and the plastic clip 14 abuts the profile of the wiper arm 1 positively.

The force to transfer the wiper arm into the operational position indicated by dash lines must be exerted by manual influence in the customary manner.

When the wiper arm 1 is raised, the anchored raised position is automatically reassumed, dictated by the staggered articulation points of wiper arm 1 and spring yoke 12.

Figure 3:
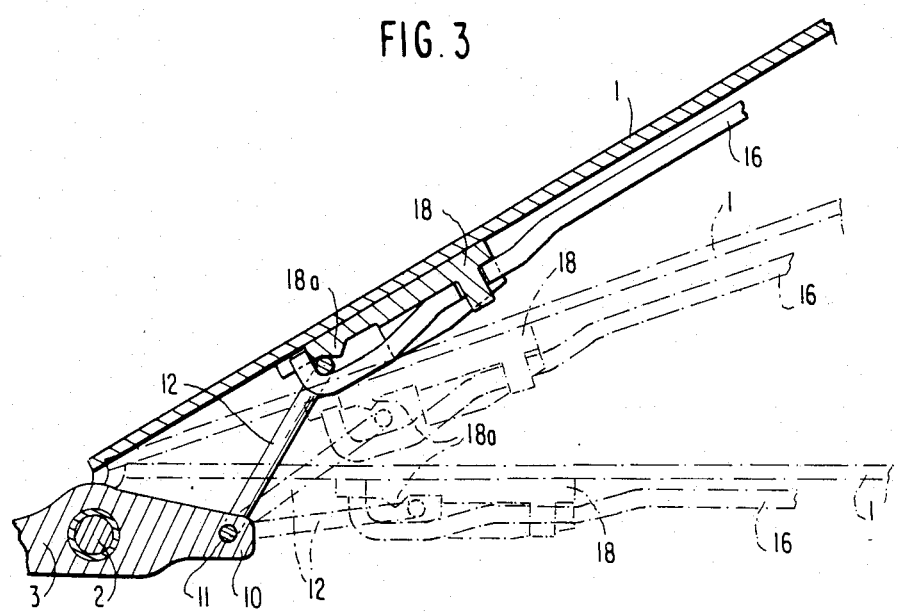
Figure 4:
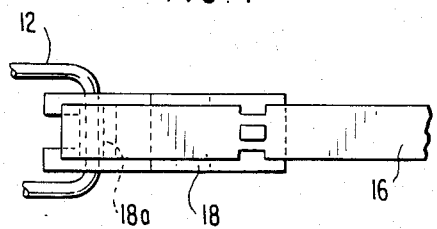

FIG. 3 and FIG. 4 illustrate a variant of the wiper arm 1, in which a sliding block control means is employed for the anchorage of the raised position. The sliding block 18 used for this purpose is of integral construction and consists here of a brass alloy. It is mounted in the manner illustrated on the lower section of the wiper rod 16, and the latter, by virtue of its resilient design serves as a catch spring which cooperates with the sliding block 18. The deflectable member of the spring yoke 12 slides over the track curve of the sliding block 18 when the wiper arm 1 is raised or pressed into contact, while due to the resilient pretension of the wiper rod 16, the spring yoke 12 always abuts the sliding block 18. In the raised position of the wiper arm 1, the spring yoke 12 is captive between a locking cam 18a of the sliding block 18 and the bent free end 16a of the wiper rod 16, which thus also serves as a stop to limit the extension of the spring yoke 12. The rising slope of the locking cam 18a must be coordinated with the pretension of the adjacent section of the wiper rod 16 so that the desired anchorage force of the wiper arm 1 is achieved in the raised position.

FIGS. 5 and 6 show an embodiment with a variant of a wiper arm 1, in which the bracing element is formed by a strut 19 of a U-shaped cross-section. The strut 19 is mounted pivotably on a bearing axis 20 which is located in the bore 11 of an extension 10 of said bearing part 3 and exhibits at the opposite end a hook-shaped terminal part 19a in which a guide bolt 21 is guided securely against axial displacement. The guide bolt 21 is stressed by a sliding block 22 spring-loaded towards the upper wall of the wiper arm 1. The spring loading is exerted in this case by a free end of a wiper rod 23 which simultaneously retains the sliding block 22 by means of a bracket 25. The helicoidal traction springs 15 are hooked on the bracket 25 on both sides of the sliding block 22. The guide bolt 21 catches into a depression 24 of the sliding block 22 for the anchorage of the wiper arm 1.

A further embodiment of anchoring the wiper arm 1 may be seen from FIGS. 7 and 8. In this case the bracing element is formed by a twisted flat strut 26. The wiper-arm-side end is bent through approximately 90° to form end 26a and hooked into a bracket 27, the hooking points for the helicoidal traction springs 15 being hooked into the bracket 27 near end 26a. The bracket 27 is in turn attached to the wiper rod 23. In order that no rattling noises may occur at the hooking point of the flat strut 26, a resilient buffer element 28 is fitted between strut 26 and bracket 27. The end opposite the hooking point of the twisted flat strut 26 is mounted for longitudinal sliding mobility by means of a bolt 29 in a slot guideway 30 of a U-shaped bifurcate extension 31.

The bolt 29 is spring-loaded via a U-shaped bent catch spring 32 made of spring wire which is braced on the bearing part side, while the slightly angled ends of the catch spring 32 abut the bolt 29. The wiper arm 1 can thus be anchored reliably in the raised position by the choice of a suitable spring characteristic for the catch spring 32.

While we have shown and described plural embodiments in accordance with the present invention, it is understood that the same is not limited thereto but is susceptible to numerous changes and modifications as known to one having ordinary skill in the art and we therefore do not wish to be limited to all the details shown and described herein, but intend to cover all such modifications as are encompassed by the scope of the appended claims.

We claim:

1. A wiper arm for a motor vehicle windshield wiper assembly having a bearing part located between a wiper arm and wiper shaft, with articulation of the wiper arm to the bearing part via a pivot axis, and having pivotability of the wiper arm out of a position of abutment against the windshield into a rest position raised from the windshield at an acute angle with respect to the position of abutment, and with stressing of the wiper arm in the direction of abutment against the windshield via a traction spring element connected to the bearing part at a first location and to the wiper arm at a second location, the connection at the first location of which, in the rest position, is located with respect to the pivot axis remote from the wiper arm, and the line of motion of which is oriented laterally offset relative to the pivot axis of the wiper arm and is offset farther from the wiper arm towards the windshield in the abutment position than in the rest position, and in which the rest position of the wiper arm is fixed relative to the bearing part, and wherein the wiper arm in its rest position is articulated relative to the bearing part by way of a bracing member engaging the bearing part at one end and the wiper arm at a second end, the bracing member being constructed as a sliding guide means forming a catch connection in the rest position of the wiper arm, said one end of the bracing member being positioned offset relative to the pivot axis of the wiper arm towards the end of the wiper arm in its abutment position, and which extends toward the wiper arm in its abutment position and obliquely away from the pivot axis towards the wiper arm in its rest position.

2. A wiper arm according to claim 1, wherein the bracing member comprises a rectangular spring yoke having first and second yoke sections of which said first yoke section is articulated in an extension of the bearing part, and the second yoke section of which engages into a catch device attached on the side of the wiper arm when the wiper arm is raised.

3. A wiper arm according to claim 2, wherein the catch device is formed as a clamp-shaped plastic clip.

4. A wiper arm according to claim 3, wherein the plastic clip is retained by a lower bent end of a wiper rod of the wiper arm.

5. A wiper arm according to claim 2, wherein the catch device is formed by a sliding block in which one of said yoke sections is slidable and positionable by the pretension of a catch spring when the wiper arm is in a raised position.

6. A wiper arm according to claim 5, wherein the sliding block is of integral construction and is clipped onto a terminal section of the wiper rod, the said terminal section of the wiper rod forming the catch spring of the catch device, and an outer end of the wiper rod is bent to limit the extension of the sliding of one of the yoke sections.

7. A wiper arm according to claim 1, wherein the bracing member is formed by a strut of U-shaped cross-section mounted pivotably on a bearing axis in an extension of the bearing part at a first end, and at a second end provided with a guide bolt, the guide bolt being slidable relative to a spring-loaded sliding block, to cause spring pretension by a free end of a wiper rod.

8. A wiper arm according to claim 1, wherein the bracing member is formed by a twisted flat strut, a first end of which is bent and is adjacent the wiper arm and hooked into a bracket mounted to the wiper arm and a second end of which is guided slidably by means of a bolt in a slot guideway of a U-shaped bifurcate extension of said bearing part, the bolt being anchored by a catch spring.

* * * * *